May 4, 1937.   C. F. RAISCH   2,079,361
LUBRICATING APPARATUS
Filed May 17, 1934
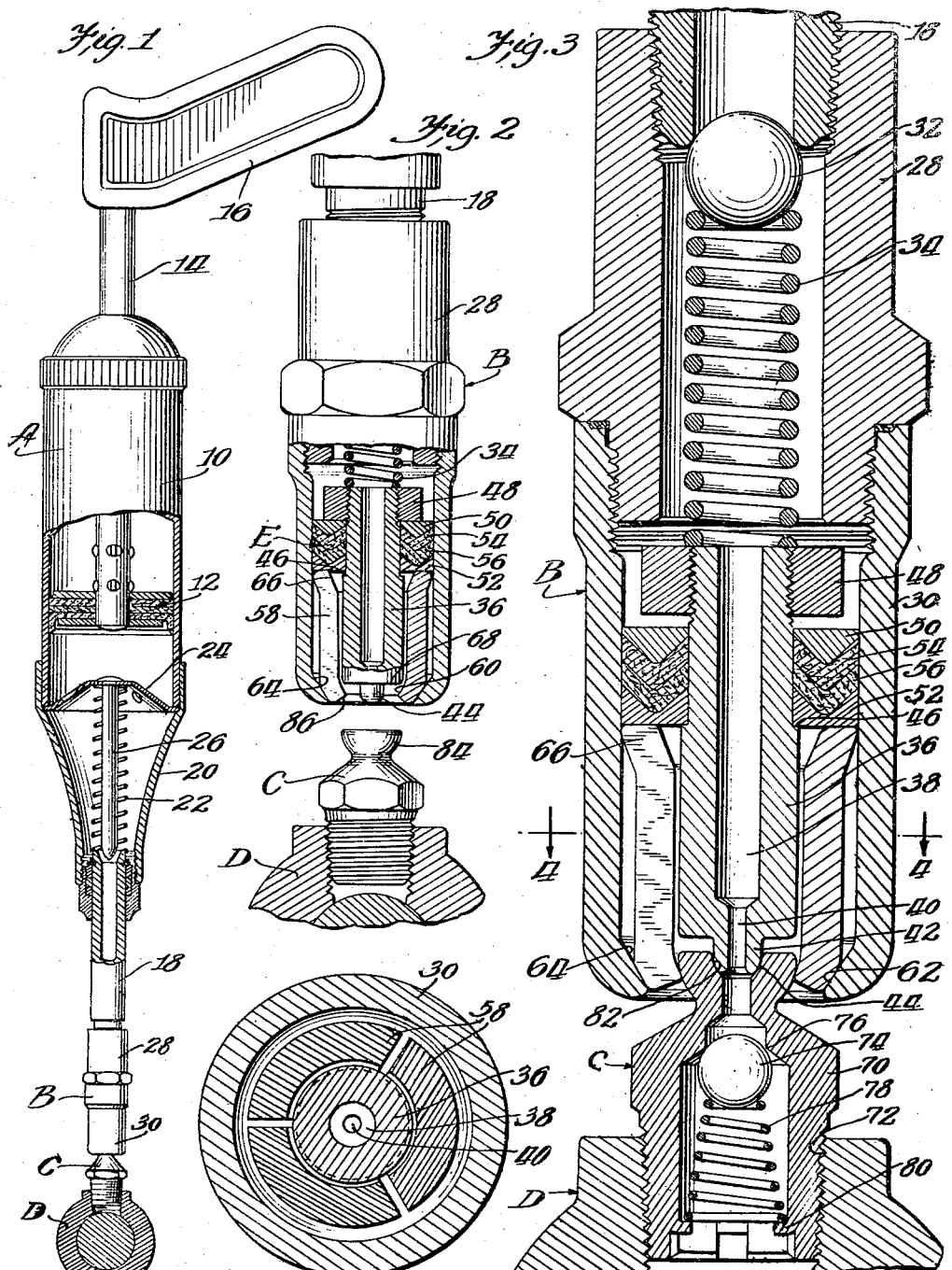
Inventor:
Charles F. Raisch
By
Williams, Bradbury, McCaleb & Hinkle. Attys Patented May 4, 1937

2,079,361

UNITED STATES PATENT OFFICE 2,079,361

LUBRICATING APPARATUS

Charles F. Raisch, Chicago, Ill., assignor to Stewart-Warner Corporation, Chicago, Ill., a corporation of Virginia Application May 17, 1934, Serial No. 726,046

4 Claims. (Cl. 285—169)

My invention pertains to lubricating apparatus and is particularly concerned with the provision of improved coupling means for high pressure lubricating systems.

In high pressure lubricating systems, the coupling means comprises a nipple adapted to be permanently screwed into a bearing and a nozzle attached to the lubricant-dispensing device and capable of making a sealed lubricant-tight contact with the nipple. One object of my invention is to provide improved coupling means wherein the sealing surfaces of the two elements of the coupling means are protected from damage when not in use.

Another object is to provide coupling means which affords only a small contact surface and which is especially effective under high lubricant pressures.

Another object is to provide coupling means which will provide easy swiveling between the nozzle and nipple even when the parts are subjected to high lubricant pressure.

Another object is to provide coupling means which may be easily operated to effect a lubricant-tight detachable connection capable of withstanding any desired lubricant pressure.

Another object is to provide an improved nozzle.

Another object is to provide an improved nipple.

Another object is to provide coupling means which may be easily and cheaply manufactured and which will be durable and trouble-free in use.

Other objects and advantages will become apparent as the description proceeds.

In the drawing,

Figure 1 illustrates a typical high pressure lubricating system, some of the parts being shown in section;

Figure 2 is an enlarged view of my improved nipple and nozzle in separated relationship, the nozzle being shown partly in section;

Figure 3 is a sectional view showing the nipple and nozzle in coupled relationship; and Figure 4 is a section through the nozzle taken on the line 4—4 of Figure 3.

In Figure 1 I have illustrated a typical example of a high-pressure lubricating system comprising a compressor A provided with a nozzle B which is shown attached to the exposed end of a nipple C which is illustrated as screwed into a bearing part D. In this embodiment of a high-pressure lubricating system the compressor is of the hand-operated type and comprises a barrel 10 for holding a quantity of lubricant, a piston 12 located in the barrel and operated by means of a piston rod 14 provided with a hand grip 16. A high-pressure cylinder 18 is reciprocably mounted in an extension 20 attached to one end of the barrel 10, the cylinder 18 being normally held in extended position, as shown, by means of a spring 22, which is seated on a perforated metal washer 24 confined between the extension 20 and the adjacent end of the barrel. A high-pressure piston 26 is attached to the washer 24 and functions to discharge lubricant from the cylinder 18 through the nozzle B and nipple C into the bearing D.

My improved nozzle B comprises a body 28 which is threadedly attached to the discharge end of the high-pressure cylinder 18, and a sleeve 30 which is screwed to the other end of the body 28. A ball check valve 32 normally closes the discharge end of the high-pressure cylinder 18 and is urged into closing position by a spring 34 resting on one end of a tube 36 having a discharge passage 38 extending throughout its length, this passage 38 being reduced in cross-section at its extreme discharge end, as indicated by reference numeral 40.

The end of tube 36, which is opposite the spring 34, is also reduced in diameter, as indicated at 42, to provide a hemispherical convex sealing surface 44 which contacts with a complementary surface on the nipple C to form a lubricant-tight seal therewith. A sealing means E surrounds the tube 36 and is confined between a shoulder 46 and a nut 48 which are so spaced as to permit slight longitudinal movement of the sealing means E relative to the tube 36. The sealing means E comprises annular metal washers 50 and 52 between which are located two annular leather gaskets 54 and 56, which are generally trough-shaped in cross-section and which effectively seal against the external surface of the tube 36 and the internal surface of the sleeve 30.

Clamping jaws 58, herein indicated as being three in number, are confined between the lower end of the sleeve 30 and the lower end of the tube 36. Each of these jaws has a radially, inwardly directed lower end provided with an inner surface 60 which is formed as part of a sphere and which cooperates with a similarly formed surface on the nipple. The outer surface 62 of each of the inclined lower ends of the clamping jaws 58 normally rests against and is supported by the frusto-conical surface 64 formed at the extreme end of the sleeve 30.

Each of the jaws 58 has an upper end 66 which projects in a radially outward direction and which normally contacts with the inner surface of the sleeve 30. Each jaw 58 may be thought of as a beam supported at its lower end by engagement with the frusto-conical surface 64 and supported at its upper end by contact of its outwardly projecting upper end with the inner surface of the sleeve 30.

As best shown in Figure 2, when the nozzle B is disconnected from the nipple, the spring 34 urges tube 36 and jaws 58 outwardly. As the jaws move outwardly, their outer ends are moved toward each other by the contracting action of the frusto-conical surface 64, and the outward movement of the jaws 58 continues until this contracting action causes engagement of the longitudinal edges of the jaws. In this position of the parts of the nozzle, the sealing surface 44 is protected against damage by the lower end of the sleeve 30 and by the lower ends of the jaws 58.

My improved nipple comprises a body 70 provided with threads 72 whereby the body may be screwed into the threaded opening leading to the bearing surfaces. The body 70 is bored out to provide a passageway therethrough, this passageway being normally closed by a ball valve 74 which is urged against a shoulder 76 by spring 78 resting on broached out lugs 80.

The upper or inlet end of the body 70 has a concavely spherical surface 82 which has the same radius as the spherical surface 44 of the nozzle, so that when the nozzle and nipple are in coupled relationship these surfaces 82 and 44 form a sealing means which permits swiveling of the nozzle B relative to the nipple. The inlet end of the nipple is also provided with a convexly spherical surface 84 which has the same radius as the spherical surfaces 60 of the jaws 58.

In order to form a lubricant-tight interlocking connection between my improved nozzle and my improved nipple, it is only necessary to move the nozzle in a generally axial direction against the inlet end of the nipple. As this is done the cup-shaped upper end of the nipple first engages the inclined surfaces 86 of the jaws 58 and presses these jaws up into the sleeve 30 against the resistance of the spring 34 and at the same time spreads these jaws radially so that after the nozzle has been pushed down over the end of the nipple a predetermined distance the jaws 58 separate sufficiently to permit the cup-shaped end of the nipple to pass between them and assume the position shown in Figure 3.

As soon as the jaws 58 separate sufficiently to permit the cup-shaped end of the nipple to pass therebetween, the spring 34 immediately urges these jaws outwardly until they clamp between the spherical surface 84 of the nipple and the frusto-conical surface 64 of the sleeve 30 and firmly interlock the nipple with the nozzle. This outward movement of the jaws 58 under the action of the spring 34 is accompanied by a similar outward movement of the small end 42 of the tube 36, and this outward movement continues until the concavely spherical sealing surface 44 firmly engages the concavely spherical sealing surface 82 of the nipple.

If, now, the grip 16 of the lubricant compressor be urged toward the bearing D, the pressure created by the resulting discharge of lubricant from the high-pressure cylinder 18 will act upon the sealing means E, and the force exerted on this sealing means is in turn transmitted to the jaws 58 and functions to more securely interlock the nozzle and nipple so that the higher the pressure created by the lubricant compressor, the more firm the grip between the cooperating parts of the nozzle and nipple.

When the pressure built up by the lubricant compressor is sufficient to overcome the resistance of the bearing, the lubricant commences to flow into the bearing and through the interstices thereof, and this flow relieves the lubricant pressure in the nozzle and nipple so that after the bearing has been properly lubricated the nozzle can be separated from the nipple by simply pulling the grip 16 away from the bearing.

While I have disclosed only one embodiment of my invention, it may be understood that my invention may assume numerous forms and that the scope of my invention may be limited solely by the following claims.

I claim:

1. In lubricating apparatus of the class described, the combination of a nipple, a nozzle adapted to form a quick, detachable swiveling connection with said nipple, said nozzle comprising a sleeve, a tube therein having a discharge passageway therethrough, said tube terminating in a spherical sealing surface, locking jaws confined between said tube and said sleeve, said locking jaws having spherical surfaces, the spherical surface of said tube and spherical surfaces of said jaws having a common center, and means for urging said jaws toward locking position, said nipple having a pair of concentric surfaces for coaction with the spherical surfaces of said nozzle.

2. In lubricating apparatus of the class described, the combination of a nozzle, a nipple having an inlet end and an outlet end adapted for attachment to a bearing, said nipple provided with concentric spherical surfaces adjacent said inlet end, one of said surfaces being concave and constituting a sealing surface, the other of said surfaces being convex and constituting a part of means for interlocking said nipple with said nozzle, said nozzle having a complementary sealing surface for coacting with the sealing surface of said nipple, and jaws constituting a part of means for interlocking said nozzle with said nipple, said jaws protecting said nozzle sealing surface when said nozzle and nipple are disconnected, said sealing surfaces and interlocking means permitting relative swiveling movement between said nozzle and nipple.

3. In lubricating apparatus of the class described, a nozzle, a nipple body having a cup-shaped inlet end, said end having a spherical inner surface constituting a sealing surface and communicating with a passageway through said body, said passageway being of reduced diameter where it merges with said surface, said end having a convexly spherical outer surface for swiveling engagement with locking means carried by said nozzle, and sealing means provided by said nozzle for coaction with said nipple sealing surface.

4. In lubricating apparatus of the class described, the combination of a nipple, a nozzle adapted to form a quick detachable swiveling connection with said nipple, said nozzle comprising a sleeve, a tube therein having a discharge passageway therethrough, said tube terminating in a convexly spherical sealing surface, locking jaws confined between said tube and said sleeve, said locking jaws having spherical surfaces, the spherical surface of said tube and the spherical surfaces of said jaws having a common center, and means for urging said jaws toward locking position, said nipple having a pair of concentric surfaces for coaction with the spherical surfaces of said nozzle.

CHARLES F. RAISCH.